HIGH CAPACITY MEMORY

Filed Sept. 26, 1962

INVENTOR.
JACK I. RAFFEL

BY

Edward D. Thomas
AGENT

United States Patent Office 3,278,913
Patented Oct. 11, 1966

3,278,913
HIGH CAPACITY MEMORY

Jack I. Raffel, Groton, Mass., assignor to Massachusetts Institute of Technology, Cambridge, Mass., a corporation of Massachusetts Filed Sept. 26, 1962, Ser. No. 226,384
6 Claims. (Cl. 340—174)

This invention relates to a thin-film memory structure and in particular to the memory array constructed by the superposition of strips of thin films to form a large number of memory elements, one at each point of superposition.

Existing thin film memory planes are limited in total memory capacity by a number of factors. One of these factors is the difficulty in obtaining uniformity in magnetic characteristics of the thin-film deposited on a large plane surface. The direction of the easy axis of the magnetic film, in particular, is found to vary with angle and radial distance from a point near the center of the plane surface. Existing deposition technology limits the size of a usable surface to one several inches on a side. Also, attempts to increase the memory capacity by decreasing the size and spacing of the individual magnetic spots comprising the memory array meet with the limitations imposed by the registration requirement and the demagnetizing effect. The registration requirement is simply the necessity for superposing the magnetic spot and the electric conductors which write-in and sense information in a magnetic spot, and also the necessity for superposing a second plane of magnetic spots over the first plane if a paired-spot type of magnetic storage is used to reduce the demagnetizing effect. As the size of the magnetic spots gets smaller, the difficulty in getting proper registration by conventional techniques which use individual substrates for deposition of magnetic spots and electrical conductors is apparent.

An object of this invention is to provide a thin film memory plane of high density (memory elements per square inch) on a plane of extended area whereby a memory plane of large capacity is obtained.

This invention has as a principle feature the automatic registration of memory elements and energizing conductors which to a large extent allows the above object to be attained.

Another feature of this invention is the simple assembly of a large memory array without electrical interconnections of smaller memory arrays by the use of magnetic coupling at the crossover points of a large number of long strips of magnetic thin-film material.

Another feature of the memory array is the use of long, narrow substrates on which are deposited a plurality of long strips of magnetic thin-film material in parallel, spaced relationship to form a basic high-yield component which may be individually tested before assembly with similar components to form a large memory array which is relatively inexpensive.

These and other objects and features of the invention will become apparent from the following diagrams and description of a specific embodiment of the invention.

Figure 1:
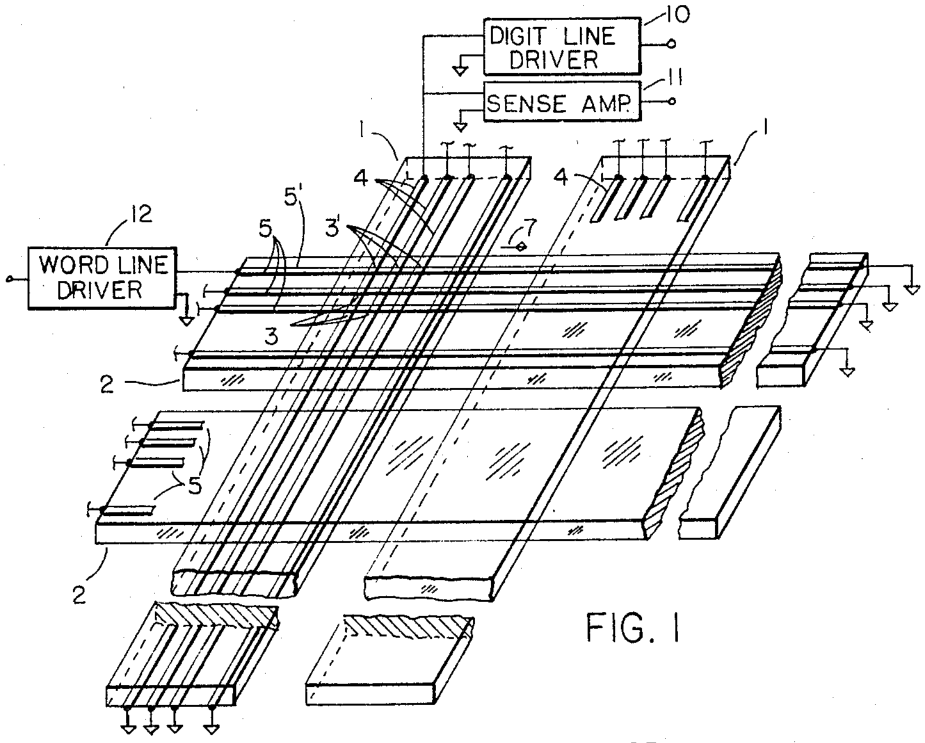
FIGURE 1 is an assembly of a memory array in accordance with the present invention.

FIGURE 1 shows a memory structure which is one embodiment of the present invention. Rectangular glass substrates 1, 2 are typically one inch wide, sixteen inches long and one-quarter inch thick. An assembly of thirty two such substrates in the manner depicited in FIGURE 1 results in a square memory plane, sixteen inches on a side. Only four substrates 1, 2 with a few strips 4, 5 and exaggerated spacing are shown in FIGURE 1 for purposes of clarity. There need not be an equal number of substrates 1, 2, nor need they be of the same length and width. On one face of substrates 1, 2 a magnetic film is evaporated with its easy axis 7 lengthwise for substrates 2 and crosswise for substrates 1. Typically, Permalloy of 1000 Angstrom units thickness has been found to be satisfactory although operation over a broad range of thicknesses is possible. A layer of copper is then deposited over the Permalloy. The thickness of the copper layer is preferably kept to a minimum but must be sufficient to avoid excessive voltage drop in the copper. Thicknesses of 0.1 to 0.2 mil with 10 mils width have been found satisfactory for the pulse current amplitudes required for switching the Permalloy. Vapor deposition for initiation of the copper layer followed by electrolytic deposition for desired thickness has been found satisfactory.

The Permalloy and copper layers are then etched by conventional photoetching into narrow lengthwise strips of copper on Permalloy with resulting perfect registration. Successful operation with 10 mil strips with 10 mil spacing for strips 5 and 2 mil strips with 2 mil spacing for strips 4 has been obtained but these dimensions should not be considered a limitation on the minimum possible strip width and spacing which is determined by the minimum acceptable signal and by proximity interference effects. A sixteen inch square memory array constructed of substrates using the above strip dimensions has the extremely large total memory capacity of approximately 3,200,000 bits.

Figure 2:
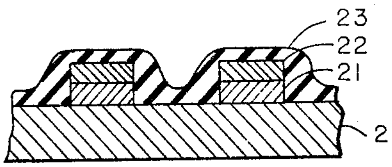
FIGURE 2 is a cross section of a substrate component of FIGURE 1 showing the construction in more detail.

All substrates 2 with lengthwise easy axes 7 are coated with an electrically insulating material on the etched copper-Permalloy strips 5. FIGURE 2 shows in cross section the copper 22 and Permalloy 21 of strips 5 over which the insulator 23 is deposited. The thickness of the insulator 23 over the copper 22 should be a minimum. It has been found that silicon monoxide is a suitable insulating material which can be deposited in a layer 0.025 to 0.1 mil thick with high uniformity. The copper-Permalloy strips 4 on substrate 1 need not be insulated since only one insulator is required.

Either before or after this insulating process, the substrates 2 are placed side by side on a surface with their etched strips 5 side up, to form a sixteen inch square covered with insulating material. The remaining sixteen substrates 1 are then placed, etched strip 4 side down and crosswise, over the square. At each area of crossover 3 of the strips 4 and 5, there exists a flux-coupled-pair of small Permalloy squares with a common easy axis direction 7. The orthogonal copper lines 22 of strips 4, 5 are selectively energized to write-in or read-out information contained in the pairs of Permalloy squares.

The thin film memory array of this invention may be used in a word organized memory. Operation of a word organized memory in which discrete magnetic spots and individual sense and digit conductor lines are available is described in applicant's co-pending application, Ser. No. 23,269. In the preferred embodiment of this invention, only one conductor line 22 in strip 4, is used for the combined function of sense and digit line. The principle of operation of a word organized memory is not altered by whether separate lines or a single line are used for the sensing and digit energization functions. Where a single line is used, the sense amplifier and digit current pulse driver must be so connected to this line that they may operate independently without excessive interference with their separate functions. A separate sense amplifier 11 and separate digit current driver 10 is connected to an end of conductor 22 of each strip 4. A separate word current driver 12 is connected to an end of conductor 22 of each strip 5. Energization of a particular word strip 5′ by a current pulse from its energized word current driver 12, causes each magnetic area 3′ on the energized strip 5′ to induce a signal current in conductor 22 of each strip 4, which signal is in turn amplified by the sense amplifier 11 connected thereto. Subsequent to said signal current, a current is produced in conductor 22 of each strip 4 by each digit current driver 10 to write-in information into the said areas 3′. Each digit current driver 10 current pulse in strip 4 produces an undesired response in the sense amplifier 11 connected to that strip. Since the signal current and undesired response occur at different times, resolution is possible on this basis. In order to reduce the time interval in which resolution can be obtained and hence get faster operation of the memory system, the amplitude of the undesired response presented to the sense amplifier must be limited to as small a value as possible. A separate sense and digit line is useful for this purpose. Where, as in the preferred embodiment of this invention a single sense-digit line is used, many circuits for accomplishing this rejection or limiting of the undesired response are available to the designer. One obvious technique is to use clipping diodes in the sense amplifier to limit the maximum voltage to a level which the desired signal attains. Another obvious technique is to employ a gated sense amplifier to reduce gain at the time of occurrence of the undesired response. Since the sense amplifier is merely a low level video amplifier, no special design problem is presented.

Alternatively, a balanced sense line technique such as described in Proc. IRE, January 1961, p. 161 can be used with the memory array of this invention. A common sense-digit line is used in the balanced sense line technique. Since the "dummy" digit-sense line used in the balanced sense line technique is not available on the memory plane of the invention either a lumped constant network simulating the "dummy" line or a "dummy" memory plane of the present invention (without the Permalloy magnetic strips) is required. Each digit line 4 of the "dummy" plane is connected according to the balanced sense line technique with the digit driver 10 connected also to the corresponding digit line 4 of the active memory array of this invention. Similarly, the connection of a word current driver 12 is made to a word line 5 of the "dummy" array and a corresponding word line 5 of the active memory array of this invention. The sense amplifiers 11 are connected to the "dummy" and active digit-sense lines 4 in a balanced circuit which reduces the effect of the undesired response while allowing the signal to enter unimpeded into the sense amplifier.

The conductor 22 of strips 4 and 5 alone does not provide a continuous electrical circuit for the current pulse generators 10, 12 connected to one end of strips 4, 5. If it is assumed that each of these generators has a terminal connected to a common "ground," then connecting the other end of strips 4, 5 to "ground" will complete the circuit. A convenient "ground" is obtained by copper plating the surface of substrates 1, 2 which is opposite the surface on which strips 4 and 5 are etched. The resulting low impedance circuit is suited for high speed operation. Numerous other techniques for forming a return conductor for strips 4, 5 will suggest themselves to those skilled in the art.

The selection of a long, narrow substrate on which extremely fine, long strips of copper and Permalloy are etched as the building block for a large capacity memory results in many advantages over earlier techniques for memory plane construction. The importance of the elimination of all internal electrical connections by the invention becomes especially apparent when memory densities achieved with and difficulty in connections between 2 mil lines is considered. The use of long strips allows many crossovers to be made along the length of the strip with an electrical connection required only at the ends of the strips. The selection of substrates before assembly for compliance with electrical and mechanical specifications also results in a memory plane assembled therefrom which has a high probability of satisfactory operation. The increased production yield results in substantial lowering of production costs. Also, long narrow substrates are substantially easier to coat with a thin-film magnetic material having uniformity in coercive force and preferred direction of magnetization than a substrate which is extended in two directions. Higher yield of suitably coated substrates also reduces cost of construction of the memory produced according to this invention.

Figure 3:
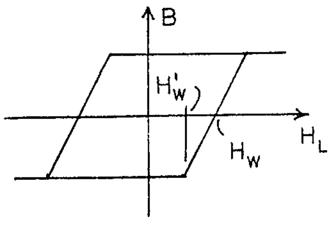
FIGURE 3 is a hysteresis loop of a thin film magnetic spot which shows the effect of air-gap reluctance.

The thickness of the Permalloy film deposited on the substrates 1 and 2 is chosen to optimize the characteristics of the Permalloy areas 3 which behave as a memory element. In general, increasing thickness causes more flux to be stored in the Permalloy which in turn gives a greater signal output when the direction of this flux is rotated by a "read-out" pulse. However, for a fixed area 3 of magnetic film, increasing film thickness reduces its reluctance. The hysteresis loop of the spot is determined by the reluctance of the complete magnetic flux path. Since a portion of the flux path is in the air surrounding the magnetic spot, the greater the reluctance of the air path relative to the reluctance of the memory element, the greater will be the departure of the hysteresis loop from rectangular. FIGURE 3 shows a hysteresis loop obtained where the air gap reluctance is relatively large compared to the film reluctance. Operation with such spots in a magnetic memory array is more difficult than with spots with nearly rectangular hysteresis loops because the maximum magnetizing force which may be applied along the easy axis without switching the flux direction in the film is reduced from $H_w$ to $H_w'$ of FIGURE 3. This reduction makes it more difficult to select a value of easy axis magnetizing force which in conjunction with a transverse magnetizing force will reliably operate a matrix of memory elements each element of which deviates from the idealized easy axis direction and nominal coercive force.

The deleterious effect of the air flux path is reduced by placing a second thin film spot in the flux path. A second thin film spot parallel to but spaced from a first magnetic spot reduces the ratio of air path reluctance to the total flux path reluctance and hence allows thicker magnetic films to be used (greater flux storage) and also causes the hysteresis loop of FIGURE 3 to be more square than if the second film were not present. A registration problem is presented by a second film in conventional memory arrays. In the present invention, the use of orthogonal strips of Permalloy automatically provides a paired-spot memory element with perfect registration at each crossover area 3.

The substrates 1, 2 must have a surface of sufficient flatness to provide uniform switching characteristics of the memory elements formed at crossovers 3 over the entire surface of the memory plane. The effect of surface irregularities is to vary the air gap separating the crossover areas 3 of the Permalloy strips. The primary effect of a varying air gap is to change the "squareness" of the hysteresis loop of FIGURE 3. An engineering choice of the maximum allowable deviation from squareness determines the maximum allowable space between strips and thereby the surface flatness required. Regions of the memory array where the spacing is smaller than the maximum causes the hysteresis loop to become squarer and increases the operating margin of safety. Since the hysteresis loop of FIGURE 3 is that obtained for magnetizing force applied along the preferred or easy axis of magnetization, the dimension of the crossover area 3 along the easy axis primarily determines the relative reluctance of the air gap and the magnetic film. As a rule of thumb, a maximum spacing approximately one-tenth the dimension of the spot in the easy axis direction usually results in a hysteresis loop sufficiently square for a satisfactory operating margin on magnitudes of digit and word line currents. Since as shown on FIGURE 2, the Permalloy strips 21 of substrates 1 and 2 when assembled in the array of FIGURE 1 are separated by the copper strips 22 of substrates 1 and 2 the insulator 23 of substrate 2, the space occupied by strips 22 and insulator 23 directly reduce the surface tolerance of the substrates 1, 2. For example, for a memory array using 10 mil strips in the easy axis direction, 0.1 mil copper strip thickness and 0.1 mil insulator thickness, a maximum separation of 1 mil for the Permalloy strips means a substrate surface tolerance of approximately ±0.15 mil. This surface tolerance is achieved by grinding and polishing a surface of a relatively thick, one-quarter inch, glass substrate. In order to minimize the possibility of bowing of the glass substrate, it is advisable to grind the opposite surface parallel to within several minutes of arc. The thickness of the glass is not critical and is chosen primarily for mechanical stability and ease of handling. Other substrate materials such as aluminum can be processed to have the required surface tolerance if desired.

Figure 4:
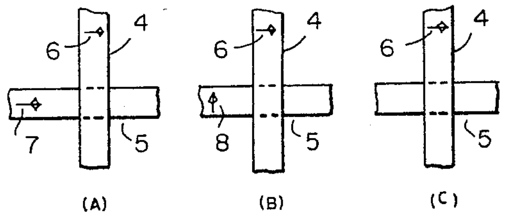
FIGURE 4 shows the easy axis direction in orthogonal magnetic strips.

If strip 5 is used as the word line in a word organized memory, a necessary condition on the easy axis of magnetization in strips 4, 5 is that after assembly as in FIGURE 1 the easy axis in either strip 4 or 5 must be in the direction of strip 5. This condition is imposed by the requirement that there must be remanent flux in the word line direction which will be rotated when there is a current pulse in the word line. There will be remanent flux in the word line direction at the crossover areas 3 if either strip 4 or 5 has its easy axis in the word line direction. A preferred direction of easy axis orientation in strips 4 and 5 is shown in FIGURE 4(a). Since the easy axes 6, 7 of strips 4, 5 are in the same direction there is no conceptual difficulty in visualizing the flux closure from strip 5 to strip 4 and the rotation of flux with current applied to strip 5. Another orientation of easy axes is that of FIGURE 4(b) where the easy axis 8 in strip 5 is transverse to the word line direction. For this situation the remanent flux in crossover area 3 will rotate from a direction in line with strip 5 to an angle determined by the relative magnitudes of the anisotropies of strips 4 and 5. The orientation of FIGURE 4(b) has been used and found to have the feature that the film regions between crossover areas 3 are demagnitized and their influence on adjacent areas 3 is reduced. FIGURE 4(c) is another possible orientation wherein strip 5 has no preferred axis of magnetization and functions only as a low reluctance path for flux produced by strip 4. The remaining two possibilities for orientation of the easy axis are thought not to possess any advantage over the orientation of FIGURES 4(a), (b), and (c).

Strips 4 and 5 need not be of the same width or spacing. In general, it is preferable for the area 3 of the crossover of strips 4 and 5 to be rectangular with the long dimension in the direction of strip 5. The primary reason for this is that increasing the length in the flux path direction increases the reluctance of the magnetic film relative to the reluctance of the air gap. Hence thicker films or more rectangular hysteresis loops are possible without serious detriment since a digit density smaller than word density is generally acceptable.

The strips 4 and 5 are restrained from moving relative to one another after assembly by mechanical means. One technique is to apply pressure to the outer surfaces of the planar assembly of substrates 1 and 2 through a resilient material with a stiff backing to which a force is applied. The resilient material uniformly distributes the pressure over the surfaces in spite of substrate irregularities. A suitable material for this purpose is rubber of moderate stiffness backed with a metal plate. Spring clips arrayed along the periphery of the plates and applying pressure tending to squeeze the plates together is satisfactory as a force means.

Figure 5:
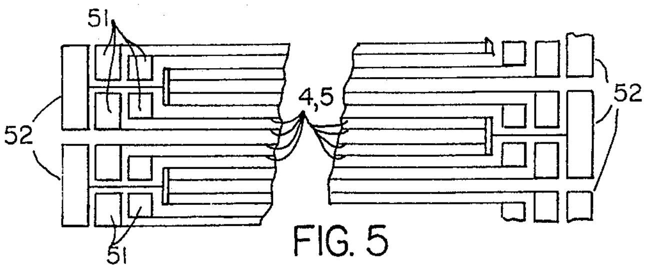
FIGURE 5 shows in detail a strip electrical conductor contact design.

External electrical connection to the ends of the copper 22 of strips 4 and 5 may be made through connectors having spring finger contacts. Since the strips are only approximately two to ten mils wide, it is necessary to widen the strips to a minimum of approximately $\frac{1}{16}$ inch at the region of contact with the connector fingers in order to get a reliable connection. FIGURE 5 shows one possible way to widen the strip at the contact area with no wasted space between strips. Strips 4, 5 connect at one end to a common contact area 52 to which the "ground" connection may be made. The other end of strips 4, 5 connect to individual contact areas 51 to which pressure contact may be made with individual fingers of a connector to which external electrical connection is made.

The composition of the Permalloy may be nickel-iron with or without cobalt depending upon the coercive force desired. Coercive forces of one to two oersteds are typical. A coercive force of this magnitude results in good hysteresis loop squareness without requiring excessive switching currents.

It is to be understood that the above-described embodiment is illustrative of the application of the principles of the invention. Numerous other arrangements may be desired by those skilled in the art without departing from the spirit and scope of the invention.

What is claimed is:

1. A high capacity thin film memory array comprising,
a first and second plurality of spaced strips of thin film magnetic material having an easy axis of magnetization along the length of said strip,
the length of said strips being at least several orders of magnitude greater than the width of said strips,
said plurality of strips having deposited thereon an electrical conductor coextensive with the length and width of said magnetic strip, a second plurality of conductive strips,
means for supporting said first and second plurality of strips in mutually orthogonal relation to provide a plurality of crossover regions of said strips where magnetic coupling exists between said strips,
said electrical conductors being electrically insulated at each crossover by an insulating film on at least one of said plurality of conductive strips,
means for electrically energizing at least one conductor in each of said first and second pluralities of conductors to provide the magnetizing force required to change the flux direction in the magnetic film at the crossover region of said energized conductors.

2. A high capacity thin film memory array comprising,
a first and second plurality of magnetically isolated spaced continuous strips of thin film magnetic material, said first plurality of strips having an easy axis of magnetization along the length of said strips,
each of said plurality of strips having superposed thereon an electrical conductor coextensive with the length and width of said magnetic film,
each electrical conductor being electrically insulated from adjacent conductors of the plurality of conductors,
means for supporting said first and second plurality of strips in closely spaced mutually orthogonal relation to provide magnetic coupling between adjacent strips,
said magnetic coupling being localized to the crossover region of said strips,
an electrical insulator,
said electrical insulator insulating the conductors of said first plurality from the conductors of said second plurality of strips, the portions of said first and second plurality of magnetic strips at each crossover form magnetic storage elements for and means for time coincident excitation of the conductors of said first and second plurality of conductors to store predetermined directions of magnetic flux in said magnetic storage elements.

3. A high capacity thin film memory array comprising, a first and second plurality of magnetically isolated spaced continuous strips of thin film magnetic material, said strips having an easy axis of magnetization along a principal axis of said strip, the direction of easy axis for all strips of said first plurality of strips being in the same direction, the direction of easy axis for all strips of said second plurality of strips being in the same direction, each of said plurality of strips having superposed thereon an electrical conductor along the length of said magnetic film, each electrical conductor being electrically insulated from adjacent conductors of said plurality of conductors, means for supporting said first and second plurality of strips in closely spaced mutually orthogonal relation to provide magnetic coupling between adjacent strips, said magnetic coupling being localized to the crossover region of said strips, an electrical insulator, said electrical insulator insulating the conductors of said first plurality from the conductors of said second plurality of strips, whereby the portions of said first and second plurality of magnetic strips at each crossover form magnetic storage elements for storing a predetermined direction of magnetic flux in response to time coincident excitation of the conductors of said first and second plurality of conductors.

4. The apparatus of claim 3 wherein:

said first and second plurality of magnetic strips are deposited directly upon first and second long, narrow substrates respectively, each of said substrates having its long dimension in the direction of said strips.

5. A high density thin film magnetic memory array comprising at least one flat substrate, a plurality of spaced strips of thin film magnetic material of narrow width deposited on said substrate, said strips having an easy axis of magnetization along their length, a separate electrical conductor deposited over the length of each strip of magnetic film and co-extensive in length and width with said magnetic strip, said electrical conductors comprising a first plurality of conductors, a second plurality of electrical conductors arranged in substantially orthogonal relationship to said first plurality of conductors, each of said second plurality of conductors being electrically insulated from said first plurality of conductors, the portions of said strips of magnetic material at each crossover of said first and second plurality of conductors forming magnetic storage elements, and means for time-coincident excitation of the conductors of said first and second plurality of conductors to store predetermined directions of magnetic flux in said magnetic storage elements.

6. A high density thin-film magnetic memory array comprising at least one long, narrow flat substrate, a plurality of spaced strips of thin-film magnetic material of narrow width deposited on said substrate, said strips having an easy axis of magnetization along their length, said length being in the long dimension of said substrate, a separate electrical conductor deposited over the length of each strip of magnetic film and co-extensive in length and width with said magnetic strip, said electrical conductors comprising a first plurality of conductors, a second substrate, a second plurality of long, narrow electrical conductors deposited on one surface of said second substrate, each of said conductors in said second plurality being insulated from every other conductor of said second plurality, means to support said first and second substrates to place the first and second plurality of conductors in orthogonal orientation, said first and second pluralities of electrical conductors being spaced by an insulator, the portions of said strips of magnetic material at each crossover of said first and second plurality of conductors form magnetic storage elements, and means for time-coincident excitation of the conductors of said first and second plurality of conductors to store predetermined directions of magnetic flux in said magnetic storage elements.

References Cited by the Examiner

UNITED STATES PATENTS

| | | | |
|---|---|---|---|
| 3,015,807 | 1/1962 | Pohm et al. | 340—174 |
| 3,092,812 | 6/1963 | Rossing et al. | 340—174 |
| 3,175,200 | 3/1965 | Hoffman et al. | 340—174 |
| 3,182,296 | 5/1965 | Baldwin et al. | 340—174 |
| 3,209,333 | 9/1965 | Russell | 340—174 |

BERNARD KONICK, *Primary Examiner.*

IRVING SRAGOW, *Examiner.*

S. M. URYNOWICZ, *Assistant Examiner.*